United States Patent
Mhatre et al.

(10) Patent No.: US 9,992,293 B2
(45) Date of Patent: Jun. 5, 2018

(54) ADAPTABLE PUSH-NOTIFICATION STATE

(71) Applicant: AT&T INTELLECTUAL PROPERTY I, L.P., Atlanta, GA (US)

(72) Inventors: Vivek Mhatre, Springfield, IL (US); Gaurav Gupta, Redmond, WA (US)

(73) Assignee: AT&T INTELLECTUAL PROPERTY I. L.P., Atlanta, GA (US)

( * ) Notice: Subject to any disclaimer, the term of this patent is extended or adjusted under 35 U.S.C. 154(b) by 391 days.

(21) Appl. No.: 13/857,050

(22) Filed: Apr. 4, 2013

(65) Prior Publication Data
US 2014/0304363 A1 Oct. 9, 2014

(51) Int. Cl.
*G06F 15/16* (2006.01)
*H04L 29/08* (2006.01)

(52) U.S. Cl.
CPC .................. *H04L 67/26* (2013.01)

(58) Field of Classification Search
CPC ......... H04L 67/04; H04L 67/26; H04L 51/14; H04L 51/38; G06F 1/3203
See application file for complete search history.

(56) References Cited

U.S. PATENT DOCUMENTS

| | | | |
|---|---|---|---|
| 2011/0029598 A1* | 2/2011 | Arnold | H04L 67/26 709/203 |
| 2011/0131321 A1 | 6/2011 | Black et al. | |
| 2012/0303774 A1 | 11/2012 | Wilson et al. | |
| 2013/0331091 A1* | 12/2013 | Chang | H04W 52/0229 455/423 |
| 2014/0006496 A1* | 1/2014 | Dearman | H04L 67/16 709/204 |

OTHER PUBLICATIONS

Apple. "Connect your iPhone, iPad, iPod touch, and Mac using Continuity", published online at [http://support.apple.com/kb/HT6337], last modified Oct. 16, 2014, retrieved on Oct. 23, 2014, 6 pages.
Apple. "iPhone, iPad, and Mac. Connected like never before." published online at [https://www.apple.com/ios/whats-new/continuity/], retrieved on Oct. 23, 2014, 5 pages.
Robertson, Adi. "Apple Handoff lets Macs and iPhones share files, phone calls, and more" published Jun. 2, 2014 online at [http://www.theverge.com/2014/6/2/5765528/apple-airdrop-now-shares-between-ios-and-os-x-devices], retrieved on Oct. 23, 2014, 19 pages.

* cited by examiner

*Primary Examiner* — Brian Whipple
*Assistant Examiner* — Gregory P Tolchinsky
(74) *Attorney, Agent, or Firm* — Amin, Turocy & Watson, LLP

(57) ABSTRACT

Adaptation of a push-notification state is disclosed. The adaptation can be based on a proximity of a first and second user equipment. The adaptation can affect push-notifications received at each device. By adapting a push-notification state, redundant push-notifications that can unnecessarily consume telecommunication resources, battery power, etc., for devices that are proximate to each other can be affected. Information relating to push-notification enabled services, services account information, device focus state information, or device environment information can be used in adapting a push-notification state. Adaptation of the push-notification state can employ a peer-to-peer or client-server topology.

20 Claims, 10 Drawing Sheets

ADAPTABLE PUSH-NOTIFICATION STATE

TECHNICAL FIELD

The disclosed subject matter relates to adaptable push-notification state settings, e.g., turning push-notification permissions on or off based on a criterion.

BACKGROUND

By way of brief background, "push" architectures for services, including applications, facilitate server initiated requests for an event transaction. These can be through a constantly open IP connection. Push architectures can be contrasted with "pull" architectures that initiate event transmission requests by a receiver or client, e.g., typically across a temporary IP connection. Common examples of push-enabled services can include instant messaging, and synchronous conferencing. Email systems can also employ push-enabled services.

Modern "push" architectures may not always be true push systems but can emulate push-architectures by employing push, pull, polling, and push-notification features. As an example, many smartphones employ a push notification service that can receive notifications from servers of application events on an constantly open IP connection. These notifications of events can be substantially smaller than the application events themselves. In response to the device receiving the push-notification, the device can then poll the related application service to receive the application event. The push-notifications can be managed by notification centers.

Push-notifications can be pushed to devices on different paths than paths that are used to access a service event or application event. For instance, push-notifications can be pushed over cellular technologies while access to the service event can be by a wireless connection, e.g., a Wi-Fi type connection, or a wired connection, e.g., an Ethernet connection. Push-notifications can trigger specific types of alerts to notify users of service events, e.g., audible alerts, vibratory alerts, banners, badges, etc.

DETAILED DESCRIPTION

Figure 1:
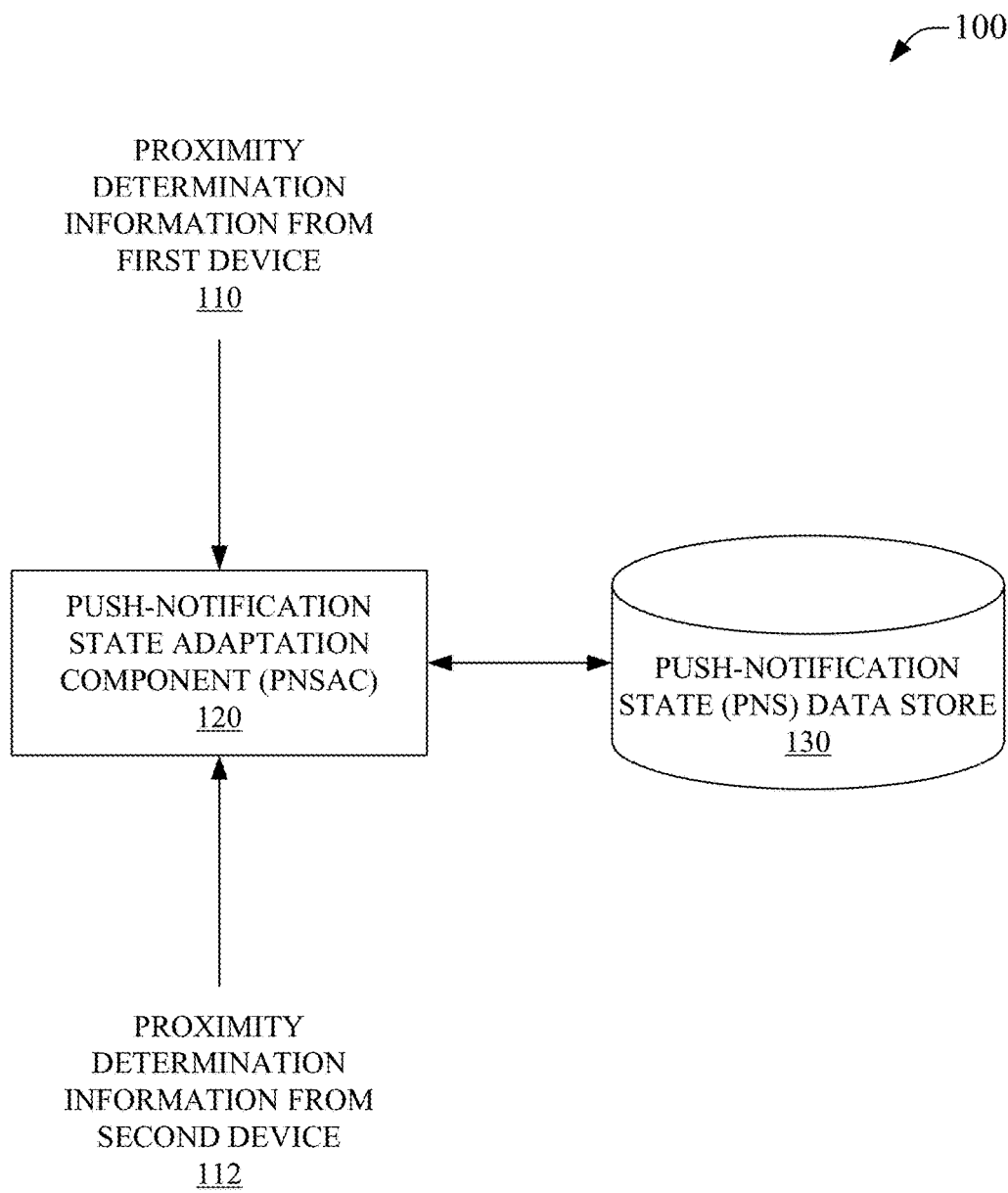
FIG. 1 is an illustration of a system that facilitates adaptation of a push-notification state in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Pushing over wireless connections, such as cellular or wireless personal area networks, can burden wireless resources and can consume stored power. The increased signaling load on communications systems can increase where additional devices receive push-notifications. Where these push notifications are redundant, the increased signaling load and/or battery drain on a mobile device can be undesirable. As such, some push-notification systems allow a user to manually turn push-notifications 'on' or 'off'. However, manual toggling of push-notification state, e.g., turning push-notifications on or off, is often time consuming for a user and, as such, is often simply ignored resulting in poor utilization of wireless resources and lowered battery runtime because users most often simply leave push-notification in the 'on' state and receive redundant push-notifications.

This effect can be magnified where there is an increase in the number of devices a user may have within their locus of control. As an example, historically, a user might receive a push notification of a service event on a workstation. In this example, there would be little chance of wasted push-notification redundancy because it would be atypical of most users to have a plurality of workstations in the same area. As a second example, where a user has a workstation at work and a PC at home, push notifications might still not be considered wasteful in that there would be value to redundantly notifying both the work and home devices of a service event because the user is likely to want the notification at the device they encounter next. However, where the use of mobile devices has drastically increased the number of user equipments in the same area, the redundancy of receiving push-notifications on each device can be viewed as wasteful of wireless resources and stored power. As a third example, where a user has a smartphone, a tablet computer, and a desktop workstation at work, and all three receive a push-notification of the same service event, the user is effectively contemporaneously notified three times for the same service event. It will be noted that the subject disclosure can relate to a single device, two devices, or more than two devices with regard to reducing redundancy of push notifications and related aspects. Furthermore, it will additionally be noted that devices can be of the same type, different types, or combinations thereof, such that a reduction in redundancy of push notifications and related aspects can be achieved in homogeneous device environments or heterogeneous device environments. Further, homogeneity and heterogeneity can apply to either hardware, software, or both. Software can include operating systems, installed applications native to a device, applications executing remote from a device, similar software-types from different solurces, etc. As such, for example, two smartphones can have the same device hardware but can be employing different versions of the devicd operating system without departing from the scope of the instant disclosure. As another example of software heterogeneity, a Yahoo™ weather application of a first device and a Google™ weather application on the same or different device can be subject to reduction of redundant push notifications and related aspects, such that the push notifications of one of the weather applications is set to 'off'. Numerous other permutations of hardware or software heterogeneity are readily available but are not presented herein in the interest of clarity and brevity, although all such permutations are within the scope of the disclosed subject matter.

Modern user equipment devices (UEs) often include sensors or systems that can imply proximity to other user equipment devices. These sensors or systems can include near field communication (NFC) components, cables, Bluetooth-type technologies, location determination technologies, Wi-Fi based positioning information, etc. As an example, where a user has a smartphone and a desktop workstation, the desktop workstation can have a defined location in geographic information system (GIS) that maps out resources within the user's place of work, and the smartphone can employ assisted global positioning system (AGPS) systems to finely determine the location of the smartphone. Where the location of the desktop workstation and the smartphone are known, the proximity of the two user equipment devices can be determined. Where the two UEs are near enough to each other, it can be concluded that redundant push-notifications would be wasteful of resources. This conclusion can be leveraged to adjust the push-notification state of a UE to reduce the use of resources to communication redundant push-notifications. As an example, where a smartphone and workstation are sitting next to each other on a desk, their close proximity can be leveraged to turn off a push-notification on the smartphone and to turn on a push-notification on the workstation. In this example, where a user receives an incoming email, the notification of the email can then be pushed to the workstation and not the smartphone reducing the consumption of resources, e.g., the push notification can be sent over a wired network to the workstation and the use of cellular resources to push notify the smartphone can be avoided.

It will be noted that criteria other than proximity can also be leveraged in adapting a push-notification state. These criteria can include, but are not limited to, identification of services/applications, focus state information, freshness of service content, and device environment information. As an example related to freshness of the service content, where a first device and a second device are proximate, but the first device has stale content (e.g., the email on the first device is not being updated, etc.), the second device can still receive push-notifications despite the proximity because the push-notifications can be considered non-redundant where the first device would potentially not be updated (e.g., remaining in a stale state). It will be noted that other criteria can be employed in inferring or determining push-notification redundancy. Further rules or algorithms can be applied to facilitate push-notification redundancy determinations or inferences, such as determining a push-notification score based on service identification, focus state, and device environment.

Identification of services/applications can include determining what services are associated with devices such that redundant push-notification states can be found. As an example, where a desktop email serviced and a mobile email service are found, these can be considered redundant because they are both email services even though they may not be the identical email service. As a further example, where a crossword puzzle application and a card game application are found, these can be considered non-redundant because they are sufficiently unrelated.

Identification of services/applications can further include determining a user of the service/application. This can be leveraged to determine redundancy based on the user of the service/application. As an example, where two tablet computers are linked by a ZigBee-type wireless connection, they can be considered sufficiently proximate that they could have redundant push-notification settings. Further, in this example, the two tablets can be owned by the same user and be employing the same service on each tablet, e.g., John owns both tablets and they are both using the same instant messaging (IM) application. However, the owner of the tablet can be different from the user of the service. As such, in this example, where the first tablet IM application is logged into by John's daughter and the second table IM application is logged into by John's wife, the identification information of the user can be used to determine that push-notification on each tablet is not redundant for the IM application and the respective push-notification state for each IM application on each tablet can be set to an 'on' state.

Focus state information can include determining the focus state of a UE. The focus state can be related to a likelihood of a user being attentive to an indication of a push-notification, e.g., a badge, banner, alert, etc. As an example, where an email service is open and an email is being actively composed, it can be determined that the user is likely focused on a composition frame of the email service. Further, it can be determined that there is a high likelihood that the user will notice a push-notification indicator for an incoming email if presented in the composition frame. Thus, the focus state information can be leveraged in the adaptation of push-notification states, such as the device and service associated with a current focus state will be set to an 'on' push-notification state to the exclusion of other redundant devices. Further, focus state information can include historical focus state information. Historical focus state information can be leveraged to determine likely future focus states. As an example, where a user frequently checks a social media service on a mobile device but rarely does so on a desktop device, it can be determined that it is more likely that the user will focus on the mobile social media service and, as such, the push notification state of the desktop social media service can be turned off and the mobile service can be turned on.

Device environment information can include information relating to the device itself. As such, device environmental information can include connection types/states, charging state, external power state, service usage information, carrier usage information, temperature information, ambient light information, motion information, orientation information, etc. This information can be employed in determining adaption of a push-notification state based on the environment of a device. As an example, where a mobile device is determined to be connected to a lightly used cellular network, the impact of redundant push-notifications can be less significant than on a congested cellular network and, as such, in the lightly used cellular network a push-notification can be set 'on' even where it is otherwise redundant. As another example, where a mobile device is determined to be in a dark environment and stationary for the last 30 minutes, such as if the mobile device were left in a desk drawer during a lunch break, it can be determined to turn off push-notifications to the mobile device. As a further example, where a tablet computer is determined to have a closed tablet cover or be face-down, push-notifications can be turned off. Similarly, where a desktop PC is determined to be running on a battery backup system, such as during a power failure, push-notifications to the PC can be set to 'off'.

User preferences can also be employed in setting adaptable push-notification states. A user preference can be embodied in user preference information, such as in user profile information, settings information, etc. User preference information can be employed to adapt push-notification states, such as where a user preference is to always receive voicemail service push-notifications on a work mobile phone and a personal mobile phone, both the work and personal mobile phone push-notifications for voicemail can be set 'on', even where the work phone and personal phone are in close proximity and might otherwise be set to reduce redundancy of push-notifications.

In an aspect, proximity, service identification, focus state information, device environment information, user preference information, etc. can be employed to automatically adapt push-notification states. These criteria can be employed to determine a score or ranking of push-notification service for a device that reduces wasteful redundancy in push-notifications. As will be appreciated, nearly a limitless number of permutations of these criteria exist, all of which are considered within the scope of the subject application despite only illustrating several possible examples herein for clarity and brevity.

In an embodiment, a system can include a processor and memory. The processor can facilitate the execution of instructions stored on the memory. The execution of the instructions can cause the processor to receive information related to determining, and to determine, proximity between a first and second user equipment. Further, the processor is instructed to adapt a push-notification state based on the proximity and to permit access to the adapted push-notification state.

In another embodiment, a method can include receiving, by a system including a processor, information related to receiving information related to a proximity between a first device and a second device. The method can also include determining a push-notification score for a service of a set of services of the first device based on the proximity between the first device and the second device. Further, the method can allow for permitting access to the push-notification score to facilitate adaptation of a push-notification state of the first device.

In a further embodiment, a tangible computer-readable storage medium can include instructions that cause a processor to perform operations comprising receiving first location information related to a first device and second location information related to a second device, then determining a proximity between the first device and the second device based on the location. The operations can further include receiving services information related to a set of push-notification enabled services, receiving focus information related to a focus state of the first device, and receiving environment information related to an operating environment of the first device. A determining of a push-notification score for a service of the set of push-notification enabled services can then be performed based on the proximity between the first device and the second, the services information, the focus information, and the environment information. The operations can also include, permitting access to the push-notification score to facilitate adaptation of a push-notification state of the first device.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates adaptation of a push-notification state in accordance with aspects of the subject disclosure. System 100 can include push-notification state adaptation component (PNSAC) 110 that can facilitate adapting the state of a push-notification information. Push-notification information can be associated with turning a push-notification on or off. PNSAC 110 can receive proximity determination information. Proximity determination information can be information that can be employing in determining the proximity of a user equipment in relation to another user equipment. In an aspect, proximity determination information can be location information that can be employed to determine the proximity of two or more devices by comparison of the location information. In another aspect, proximity determination information can be information that infers a level of proximity between two or more devices. As an example, two devices connected by a USB cable can be inferred to be with the length of the USB cable from each other. As another example, two devices connected by a strong Body Area Network-type (BAN) connection, e.g., Institute of Electrical and Electronics Engineers (IEEE) 802.15.6 standard, can be inferred to be within about 6-feet of each other. As a further example, a device detecting a radio frequency identification (RFID) circuit in another device, or and RFID chip acting as a beacon, can be inferred to be within centimeters to meters of the detected RFID chip.

PNSAC 110 can receive proximity determination information from a first device at 110. PNSAC 110 can further receive proximity determination information from a second device at 112. As an example at 110, proximity determination information can be location information of a first device, such as GIS information for a desktop PC. As a further example, at 120, proximity determination information can be range information for a mobile device from an RFID beacon having a known location. As such, the proximity of the desktop PC and mobile device can be determined and employed in adaption of a push-notification state at PNSAC 120.

In an embodiment, PNSAC 120 can be embodied in a device that is providing proximity determination information. As an example, PNSAC 120 can be part of the first device at 110 or the second device at 112. In a further embodiment, PNSAC 120 can be embodied in a device that is not providing proximity determination information. As an example, PNSAC 120 can be embodied in a device, such as a server, NodeB, wireless access point, etc., that receives information at 110 and 120.

PNSAC 120 can be communicatively coupled to push-notification state (PNS) data store 130. PNS data store 130 can be located near PNSAC 120 or can be located remotely from PNSAC 120. As an example, PNS data store 130 can be located in the first device of 110 or the second device of 120 with PNSAC 120, such as where PNSAC 120 is embodied in a smartphone and PNS data store 130 is embodied in the physical memory of the smartphone. In a further example, PNSAC 120 can be embodied in an access point near the first device of 110 and the second device of 120 while PNS data store 130 can be embodied in a cloud-computing environment communicatively coupled to PNSAC 120 by way of a network.

PNS data store 130 can store a push-notification state or set of push-notification states. A push-notification state can include an 'on' state and an 'off' state. PNSAC 120 can adapt the state of a push-notification state, e.g., setting a push-notification state to a particular state, indexing a push-notification state, toggling a push-notification state, etc. As an example, where a push-notification state is initially '1', the state can be set to '0', set to '1', toggled to '0', indexed to '2', etc. In a further example, where a push-notification state is initially 'on', the state can be set to 'off', set to 'on', toggled to 'off', indexed to 'off', etc. PNS data store 130 can facilitate access to a stored push-notification state, a set of push-notification states, wherein the set can be an empty set, a subset, or all push-notification states. It will be noted that a push notification state can also include other states, such as, but not limited to, a sleep state, an intermittent state, etc. For clarity and brevity, other states, while within the scope of the subject disclosure, are not further discussed.

In an aspect, a push-notification state stored on PNS data store 130 can facilitate push-notification actions at a device. As an example, a push-notification register of the first device of 110 can embody PNS data store 130. The first device of 110 can further embody PNSAC 120. PNSAC 120 can receive proximity determination information from the first device at 110 and can receive proximity determination information from a second device at 112, such as by receiving an RFID signal associated with the second device of 112. PNSAC 120 can then determine if a push-notification state is to be adapted based on the determined proximity of the first and second device. Where a push-notification state is to be adapted, PNSAC 120 can update a push-notification state stored in the push-notification register of the first device. The update to the register of the first device can affect the push-notification action of the first device, such as, the first device can then receive push-notifications after a push-notification state is toggled to an 'on' state or can stop receiving push-notifications after a push-notification state is set to 'off', etc.

In an embodiment where PNS data store 130 is located apart from a device associated with determining adaptation of a push-state notification, such as where the PNS data store 130 is located on a carrier network server, PNS data store 130 can facilitate access to the stored and/or updated push-notification state information by one or more devices. As an example, a user can have a phone and a tablet computer that each include PNSAC 120 and each access a wireless carrier network. Each PNSAC 120 can be communicatively coupled to a PNS data store 130 located on a wireless carrier network component. Each PNSAC 120 can determine adaptation of a push-notification state based on the proximity to the other device and can store the push-notification states on the carrier network PNS data store 130. The push-notification states stored on PNS 130 can be mirrored onto the local memory of each of the phone and tablet to allow push-notification actions to be affected local to the phone and tablet. Further, the push-notification states stored on PNS data store 130 can also be employed to control push-notification actions on other components and devices, such as by de/registering a push service at a third-party push-server, e.g., a web-based email service push-notification server.

Figure 2:
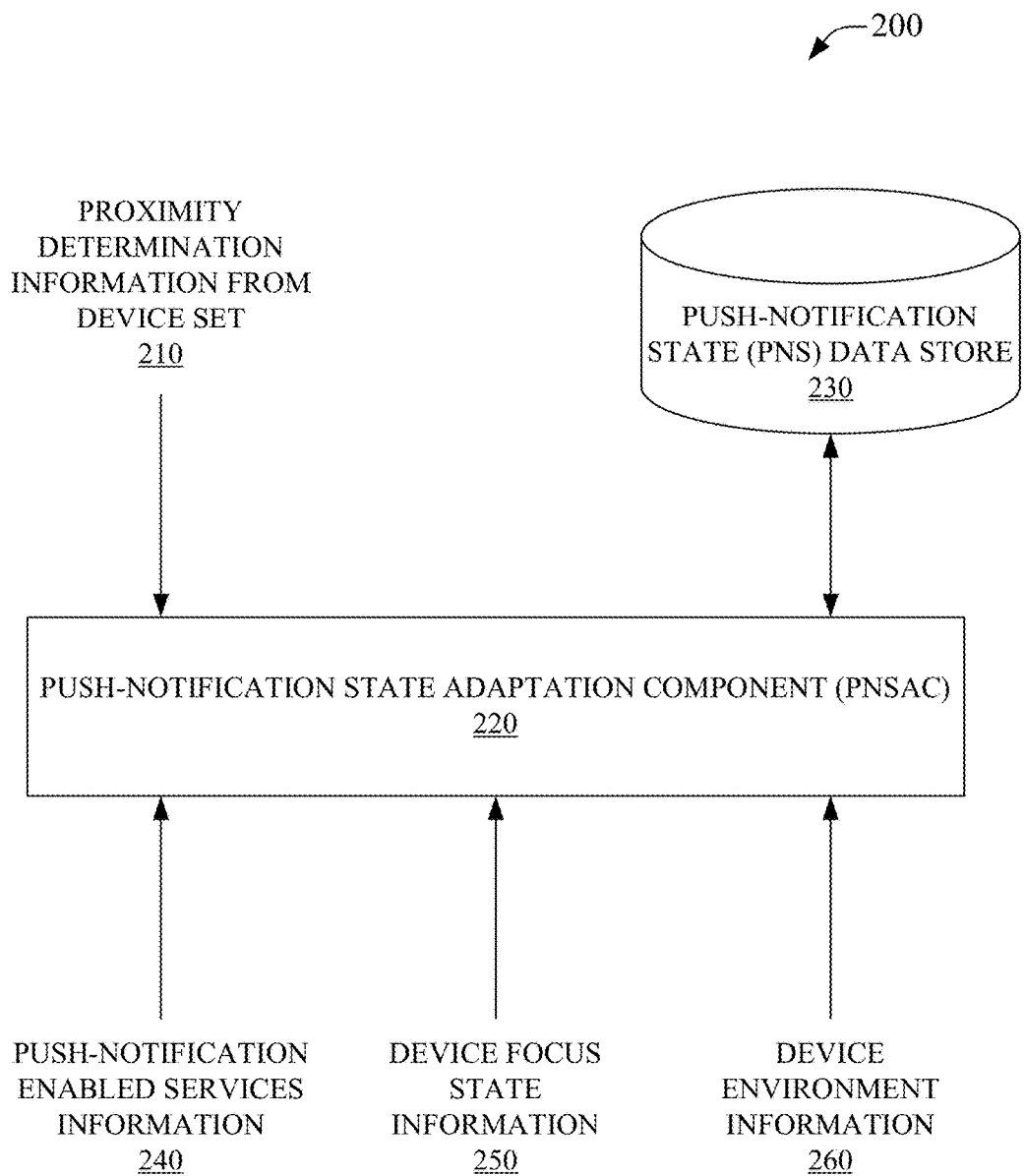
FIG. 2 is a depiction of a system that facilitates adaptation of a push-notification state based on factors in addition to proximity in accordance with aspects of the subject disclosure.

FIG. 2 is a depiction of a system 200 that can facilitate adaptation of a push-notification state based on factors in addition to proximity in accordance with aspects of the subject disclosure. System 200 can include push-notification state adaptation component (PNSAC) 220 that can facilitate adapting the state of a push-notification information. In an aspect, push-notification information can be associated with turning a push-notification on or off. PNSAC 220 can receive proximity determination information at 210. Proximity determination information can be information that can be employing in determining the proximity of a UE to another UE. In an aspect, proximity determination information can include location information. In another aspect, proximity determination information can comprise information that infers proximity between two or more devices.

PNSAC 220 can be communicatively coupled to PNS data store 230. PNS data store 230 can be located with PNSAC 220 or can be located remote from PNSAC 220. PNS data store 230 can store a push-notification state or set of push-notification states. A push-notification state can include an 'on' state and an 'off' state. PNSAC 220 can adapt the state of a push-notification state. PNS data store 230 can facilitate access to a stored push-notification state. In an aspect, a push-notification state stored on PNS data store 230 can facilitate push-notification actions at a device.

PNSAC 220 can receive push-notification enabled service information at 240. Push-notification enabled service information can include identification of services/applications can include determining what services are associated with devices. As an example, where a tablet computer email service and a smartphone email service are identified, these can be considered redundant because they are both email services even though they may not be identical email services. As a further example, where a corporate cloud drive application and a corporate file transfer protocol application are identified, these can be considered non-redundant because they are unlikely to push a notification for the same service event. Identification of services/applications can further include determining an account identity of a service/application. Account identity can be leveraged to determine redundancy based on the account interacting with the service/application. As an example, tablet computers can be sufficiently proximate that they could have redundant push-notification settings. Further, in this example, the two tablets can have the same health care application installed on each. Where, in this example, where the first tablet application is signed into account '1234' and the second application is signed into account '5678', the different account information can indicate that push-notifications on each tablet are not redundant for the health care application and the respective push-notification states can be set to an 'on' state despite being proximate to each other.

PNSAC 220 can further receive device focus state information at 250. Device focus state information can include a determination of the focus state of a UE. The focus state can be related to a likelihood of a device user being attentive to an indication of a push-notification, e.g., a badge, banner, alert, etc., at a device. The focus state can be determined from input into the device, such as an input selecting to bring a user interface for a service to the foreground of a display, an input de/activating a vibrate feature of a device, an input de/activating an audio feature of a device, an input minimizing open application interface on a display such that a set of icons representative of available services/applications is at least partially displayed, etc. As an example, where open applications are minimized/closed and the 'desktop' of a graphical user interface (GUI) is displayed in the forefront of a computer monitor, it can be determined that the user is likely to notice visual alerts, such as badges on desktop icons for installed services/applications, related to push-notifications of the displayed desktop icons. As such, the focus state information can be employed in a determination that the adaptation of push-notification states for displayed desktop icons can be set to an 'on' push-notification state. Further, focus state information can include historical focus state information. Historical focus state information can be employed in forming inferences or predicting likely future focus states. As an example, where a user typically checks a social media service on a desktop PC at 9 am when arriving at work, it can be inferred that it is more likely that the user will do so again and, as such, the push notification state of the desktop social media service can be turned 'on' and other potentially redundant push-notification states can be set to 'off'.

PNSAC 220 can also receive device environment information at 260. Device environment information can include information relating to a subject device. As such, device environmental information can include connection types/states, charging state, external power state, service usage information, carrier usage information, temperature information, ambient light information, motion information, orientation information, etc. This information can be employed in determining adaption of a push-notification state based on the environment of a device. As an example, where a mobile device is determined to be connected to a highly congested cellular network, the impact of redundant push-notifications can be more significant than on a lightly congested cellular network and, as such, push-notification states for services of the mobile device can be demoted or set 'off'.

In an aspect, PNSAC 220 can determine a push-notification score. This push-notification score can reflect a determination related to adapting a push-notification state. The determination can include proximity information, services information, focus state information, device environment information, etc. In an aspect, the push-notification score can be based on application of one or more rules or algorithms applied to the information received at PNSAC 220. As an example, a rule can increase or decrease the likelihood of a push-notification state being adapted, such that network resource consumption from redundant push-notifications is reduced. As another example, a rule can increase or decrease the likelihood of a push-notification state being adapted, such that a user profile is more closely followed.

Figure 3:
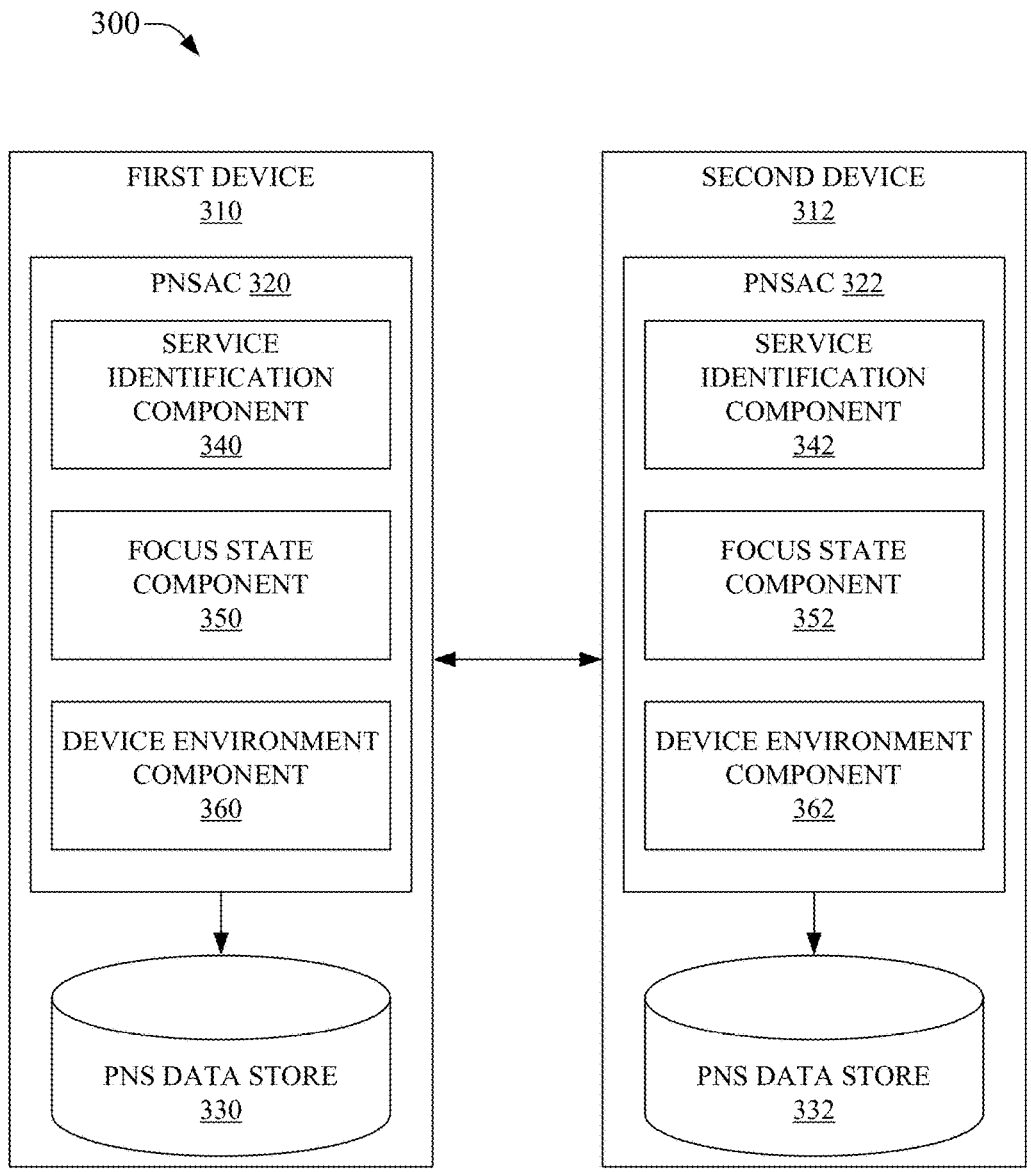
FIG. 3 illustrates a system that facilitates adaptation of a push-notification state between two devices in accordance with aspects of the subject disclosure.

FIG. 3 illustrates a system 300 that facilitates adaptation of a push-notification state between two devices in accordance with aspects of the subject disclosure. System 300 can include push-notification state adaptation component (PNSAC) 320 that can facilitate adapting a push-notification state. In an aspect, a push-notification state can be associated with turning a push-notification on or off. PNSAC 320 can receive proximity determination information from first device 310. Proximity determination information can be information that can be employed in determining the proximity of a first device 310 to another UE, such as second device 312. In an aspect, proximity determination information can include location information. In another aspect, proximity determination information can comprise information that infers proximity between two or more devices.

PNSAC 320 can be communicatively coupled to PNS data store 330. PNS data store 330 can be co-located with PNSAC 320. PNS data store 330 can store a push-notification state or set of push-notification states. A push-notification state can include an 'on' state and an 'off' state. PNSAC 320 can adapt the state of a push-notification state stored on PNS data store 330. PNS data store 330 can facilitate access to a stored push-notification state. In an aspect, a push-notification state stored on PNS data store 330 can facilitate push-notification actions at a device.

PNSAC 320 can comprise service identification component 340. Service identification component 340 can determine push-notification enabled service information. Push-notification enabled service information can include identification of services/applications of first device 310. As an example, where first device 310 has an installed email service application, this service can be identified. Identification of services/applications can further include determining an account identity of a service/application. Account identity can be leveraged to determine redundancy based on the account interacting with the service/application. As an example, where first device 310 has an email service, service identification component 340 can determine the logged in account for the email service.

PNSAC 320 can further comprise focus state component 350. Focus state component 350 can determine device focus state information. Device focus state information can include a determination of the focus state of first device 310. The focus state can be related to a likelihood of a device user being attentive to an indication of a push-notification, e.g., a badge, banner, alert, etc., at first device 310. The focus state can be determined from input into first device 310, not illustrated. As an example, an input to first device 310 can be selection of a user interface for a service, bringing the service user interface to the foreground of a display of first device 310, an input de/activating a vibrate feature of a device, an input de/activating an audio feature of a device, etc. As such, focus state information can be employed in a determination by PNSAC 320 relating to the adaptation of push-notification states for first device 310. Further, focus state information can include historical focus state information. Historical focus state information can be employed in forming inferences or predicting likely future focus states. Further, historical focus state information can be associated with the history of first device 310 itself or the history of an identified profile accessed by way of first device 310. As an example, where a user logs into a profile on a desktop computer, the focus information can comprise the historical focus information for that profile rather than the historical focus information for every user of the desktop computer. As a further example, historical focus information can embody the historical use of the device itself, such as for highly personal devices like smartphones, etc.

PNSAC 320 can additionally comprise device environment component 360. Device environment component 360 can determine device environment information relating to a subject device, e.g., first device 310. As such, device environmental information can include connection types/states, charging state, external power state, service usage information, carrier usage information, temperature information, ambient light information, motion information, orientation information, etc. This information can be employed in determining adaption of a push-notification state based on the environment of a device, including first device 310. As an example, where a mobile device is determined to be connected to a highly congested cellular network, push-notification states for services of the mobile device can be demoted or set 'off'.

In an aspect, system 300 can further include second device 312. Second device 312 can comprise PNSAC 322, PNS data store 332, service information component 342, focus state component 352, and device environment component 362, that can be the same as, or similar to the corresponding components of first device 310. First device 310 can be communicatively coupled to second device 312.

In an aspect, first device 310 and second device 312 can share information related to adapting a push-notification state. This can include sharing location information or proximity determination information, as disclosed herein above, to facilitate determining the proximity of first device 310 and second device 312. Further, Service information can be shared to determine a set of push-enabled services for first device 310 and second device 312 that can be associated with redundant push-notifications. This set can all, some, or none of the services/applications of both first device 310 and second device 312. As an example, where first device 310 has an email service and a game service and second device 312 has an email service and a mapping service, the set of services can be the email service because the push-notifications of the game service and mapping service are unlikely to be redundant between first device 310 and second device 312.

Sharing information can further include sharing focus state information. As an example, the focus state of first device 310 can be shared with second device 312. PNSAC 322 can employ the focus state information of first device 310 to determine adaptation of a push-notification state, such as, deactivating a push-notification for an email service of second device 312 where the email service is the focus of first device 310 and not the focus of second device 312, e.g., it is more likely that a user will notice a push-notification on the first device than the second because the email service is the focus of the first device but not the second.

Moreover, sharing information can include sharing device environment information. Sharing device environment information can facilitate adaptation of push-notification state on first device 310 and/or second device 312. As an example, PNSAC 320 can employ the device environment information of second device 312 to determine adaptation of a push-notification state, such as toggling a push-notification state based on second device 312 being connected to a wall outlet power supply and first device 310 being on battery only power.

It will be noted that system 300 can include more than two devices, e.g., first device 310 and second device 312. System 300, in an aspect, illustrates a peer-to-peer setup for adaptation of push-notification states. In some embodiments, all devices of system 300 can be interconnected. In other embodiments, subsets of the devices of system 300 can be interconnected, for example system 520 of FIG. 5. In still other embodiments, a hierarchical topology can be adopted for interconnection of devices of system 300, for example, system 530 of FIG. 5.

Figure 4:
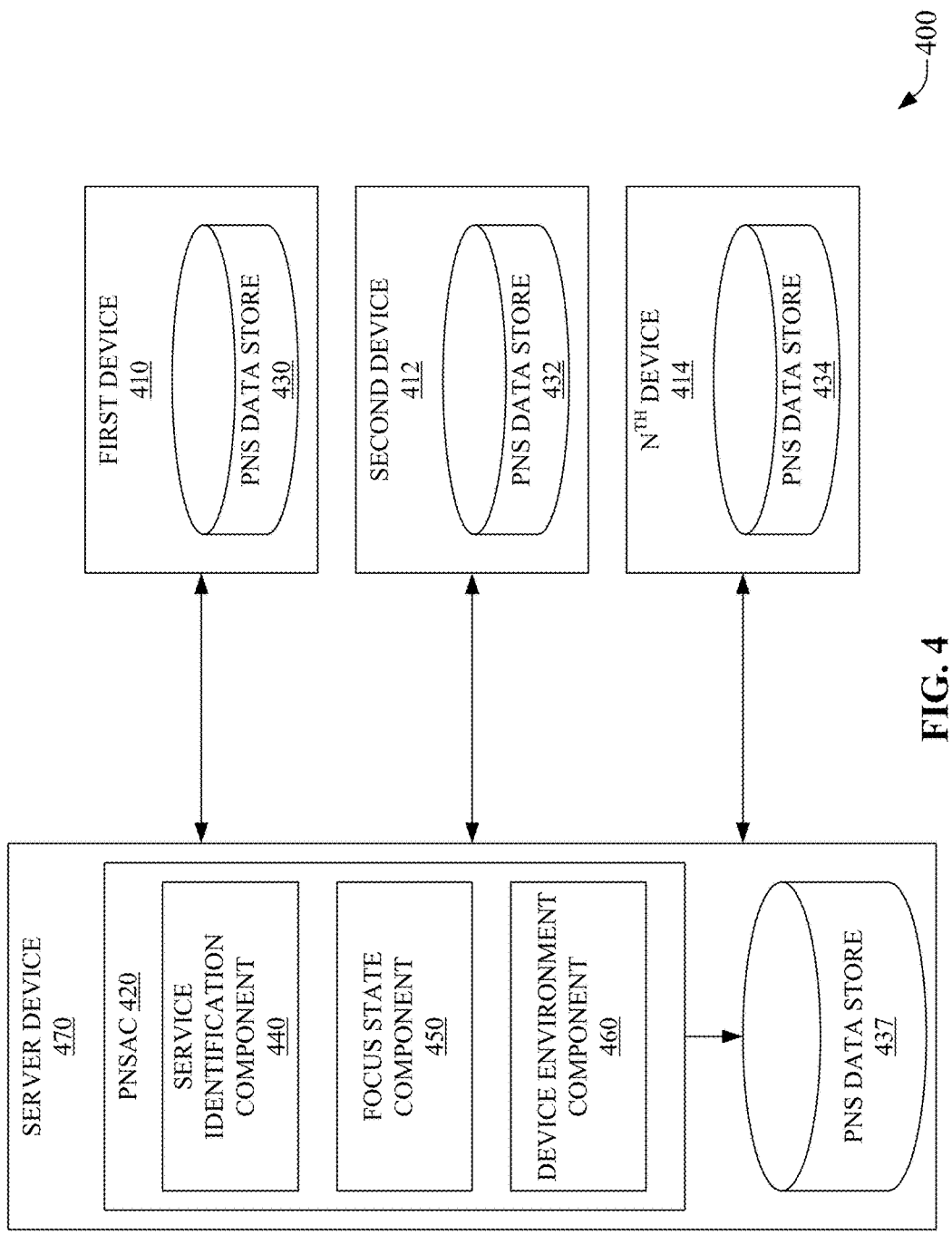
FIG. 4 illustrates a system that facilitates server-based adaptation of a push-notification state of user equipment in accordance with aspects of the subject disclosure.

FIG. 4 illustrates a system 400 that facilitates server-based adaptation of a push-notification state of user equipment in accordance with aspects of the subject disclosure. System 400 can include server device 470 that can include server-side push-notification state adaptation component (PNSAC) 420 that can facilitate adapting a push-notification state. In an aspect, a push-notification state can be associated with turning a push-notification on or off. Server-side PNSAC 420 can receive proximity determination information from a client, such as first device 410. Proximity determination information can be information that can be employed in determining the proximity of a UE, such as first device 410, to another UE, such as second device 412. In an aspect, proximity determination information can include location information. In another aspect, proximity determination information can comprise information that infers proximity between two or more devices.

Server-side PNSAC 420 can be communicatively coupled to server-side PNS data store 437. Server-side PNS data store 437 can be co-located with server-side PNSAC 420, as illustrated, or can be remotely located from server device 470, not illustrated. Server-side PNS data store 437 can store a set of push-notification states that can comprise a push-notification state. A push-notification state can include an 'on' state and an 'off' state. Server-side PNSAC 420 can adapt the state of a push-notification state stored on server-side PNS data store 437. Server-side PNS data store 437 can facilitate access to a stored push-notification state of a device, such as first device 410, etc. In an aspect, a push-notification state stored on server-side PNS data store 437 can facilitate push-notification actions at a device, such as second device 412, etc. Further, server-side PNSAC 420 can be communicatively coupled to a device-side PNS data store, such as PNS data store 430, 432, 434, etc. Server-side PNSAC 420 can store a set of push-notification states that can comprise a push-notification state on a device-side PNS data store. In an aspect, server-side PNSAC 420 can directly store a set of push-notification states on a device-side PNS data store. In a further aspect, server-side PNSAC 420 can mirror a set or subset of push-notification states stored on a server-side PNS data store 437 to a set of push-notification states on a device-side PNS data store, such as PNS data store 430, 432, 434, etc.

Server-side PNSAC 420 can comprise service identification component 440. Service identification component 440 can determine push-notification enabled service information for a client device, e.g., first device 410, second device 412, . . . , $N^{th}$ device 414, etc. Push-notification enabled service information can include identification of services/applications of a client device. As an example, where first device 410 has an installed email service application, this service can be identified by server-side service identification component 440. Identification of services/applications can further include determining an account identity of a service/application. Account identity can be employed to determine push-notification redundancy based on the active account of the service/application. As an example, where first device 410 has an email service, server-side service identification component 440 can determine the logged in account for the email service.

Server-side PNSAC 420 can further comprise focus state component 450. Focus state component 450 can determine device focus state information for a client device, e.g., first device 410, second device 412, etc. Device focus state information can include a determination of the focus state of a client device. The focus state can be related to a likelihood of a client device user being attentive to an indication of a push-notification, e.g., a badge, banner, alert, etc., at the client device. The focus state can be determined from a signal, such as a keystroke, tap, or mouse-click, received by the client device, e.g., 410, 412, 414, etc., not illustrated. Client device focus state information can be employed in a determination by PNSAC 420 relating to the adaptation of push-notification states for client devices, e.g., 410, 412, 414, etc. Further, focus state information can include historical focus state information. Historical focus state information can be employed in forming inferences or predicting likely future focus states. Further, historical focus state information can be associated with the history of a client device itself or the history of an identified user account accessed by way of the client device. As an example, where a user logs into an account on a thin client device, the focus information can comprise the historical focus information for that account rather than the historical focus information for every account accessed through the thin client device.

Server-side PNSAC 420 can additionally comprise device environment component 460. Device environment component 460 can determine device environment information relating to a client device, e.g., first device 410, second device 412, etc. As such, device environmental information can include connection types/states, charging state, external power state, service usage information, carrier usage information, temperature information, ambient light information, motion information, orientation information, etc., of a client device. This information can be employed in determining adaption of a push-notification state based on the environment of the client device. As an example, where a client device, e.g., first device 410, is determined to be connected to a highly congested cellular network, push-notification states for services of the client device can be set to an 'off' state to reduce/minimize further congestion on the cellular network resulting from push-notifications to the client device.

In an aspect, system 400 can further include client devices, e.g., first device 410, second device 412, . . . , $N^{th}$ device 414, etc. Although not expressly illustrated, client devices can further comprise PNSAC, PNS data store, service information component, focus state component, and device environment component, that can be the same as, or similar to the corresponding components of first device 310, second device 312, etc. Further, although not expressly illustrated for clarity and brevity, client devices can be interconnected as well.

Figure 5:
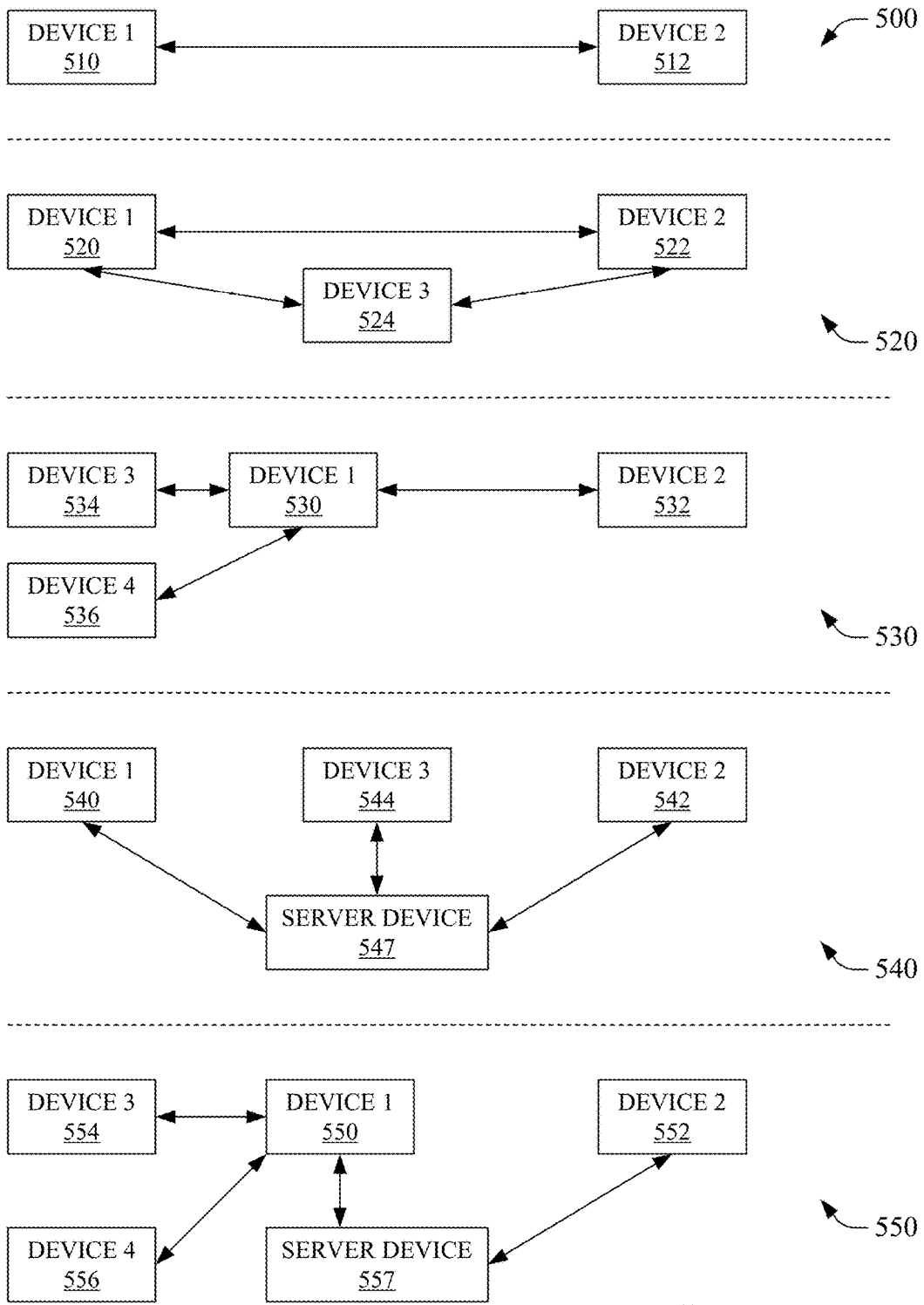
FIG. 5 illustrates systems that facilitate adaptation of a push-notification state in accordance with aspects of the subject disclosure.

FIG. 5 illustrates systems 500, 520, 530, 540, and 550, that facilitate adaptation of a push-notification state in accordance with aspects of the subject disclosure. Systems 500, 520, and 530 illustrate peer-to-peer type topologies. System 500 illustrates to peer devices, e.g., device 1 (510) and device 2 (512), interconnected, for example where a desktop and a mobile device are proximate to each other. System 520 illustrates three devices, 520, 522, and 524, interconnected, such as where a desktop, a tablet computer, and a smartphone are proximate to each other.

System 530 illustrates a tiered topology. In system 530 device 1 (530) and device 2 (532) can be communicatively coupled similar to system 500. Device 3 (534) and device 4 (536) of system 530 can be coupled to device 1 (530). As such, device 1 (530) can act as a master for servant device 3 (534) and servant device 4 (536). As such, device 3 (534) and device 4 (536) can adopt the push-notification states of device 1 (530). As an example, where device 1 (530) adapts an email service push-notification to 'off', device 3 (534) and device 4 (536) can also set their email service push-notification to 'off'. The master-servant relationship can be determined based on a separate iteration of determining adaptation of push-notification states for the subset of devices in system 530 excluding device 2 (532).

Systems 540 and 550 illustrate server-client topologies. System 540 can be the same as or similar to system 400. As such, there can be a server-client relationship between device 1 (540) and server device 547, device 2 (542) and server device 547, and device 3 (544) and server device 547.

System 550 can include a hierarchical topology in the overarching server-client topology. As such, device 1 (550) and server device 557 and device 2 (552) and server device 557 can exhibit a server-client relationship that can be the same as, or similar to, that of system 540 or, in FIG. 4, system 400. Further, device 1 (550) can have a master-servant relationship with device 3 (554) and device 4 (556) in a manner similar to system 530.

It will be noted that other permutation of network topology can be illustrated but are not done so herein for the sake of clarity and brevity. Although such other topologies are not illustrated, they are enabled and are considered within the scope of the instant application.

Figure 6:
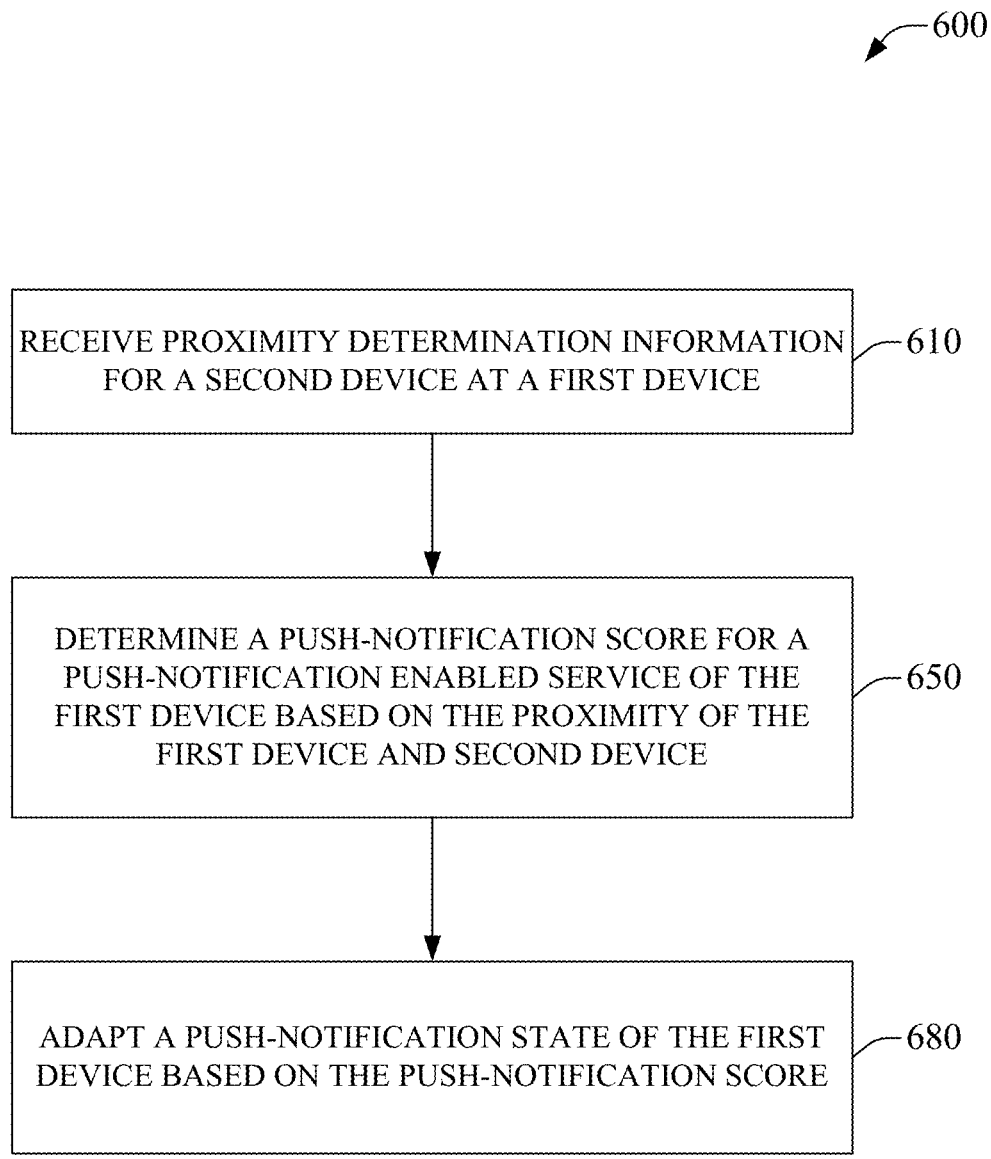
FIG. 6 illustrates a method for facilitating adaptation of a push-notification state in accordance with aspects of the subject disclosure.
Figure 7:
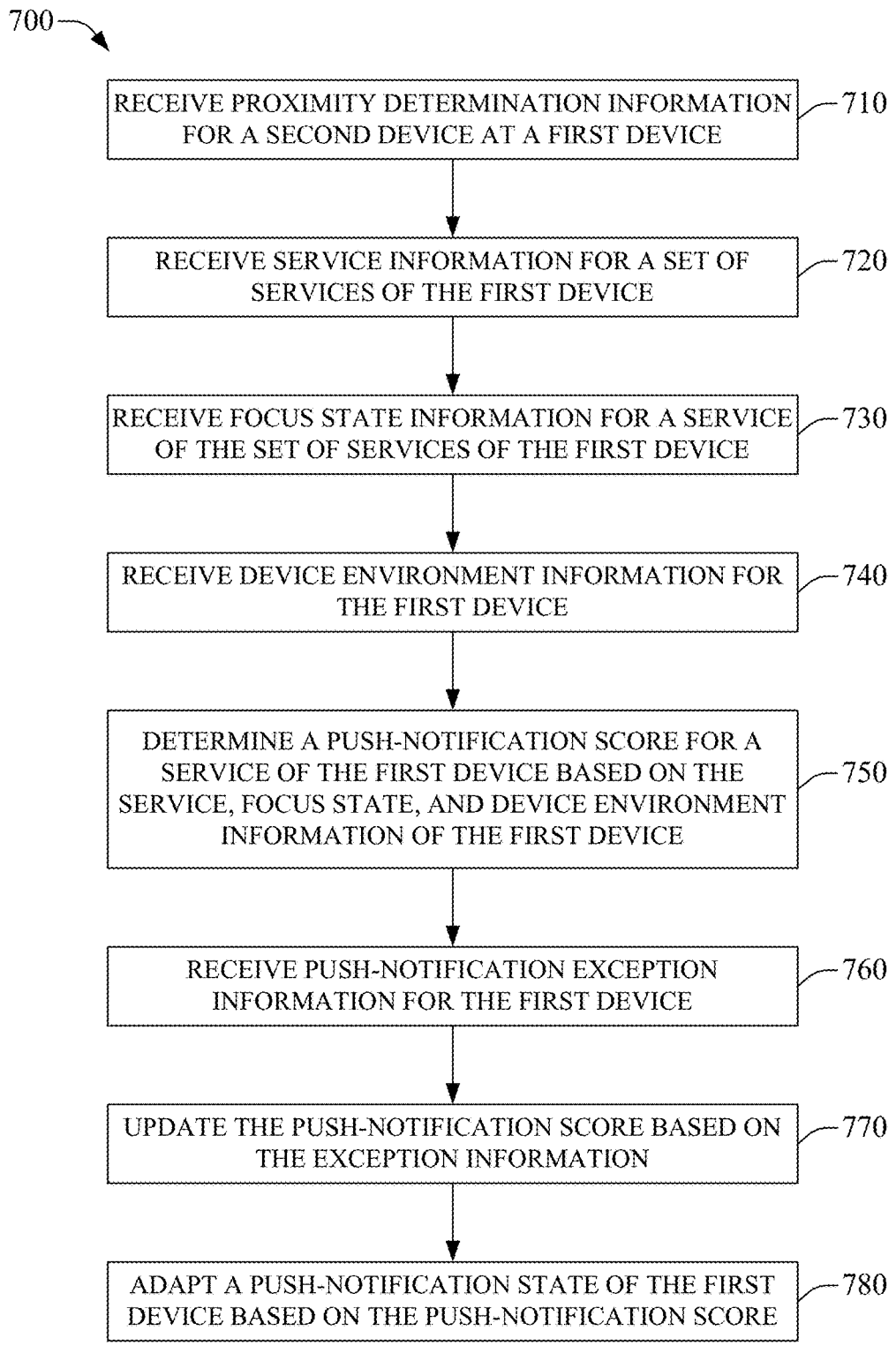
FIG. 7 illustrates a method for facilitating adaptation of a push-notification state based on factors in addition to proximity in accordance with aspects of the subject disclosure.
Figure 8:
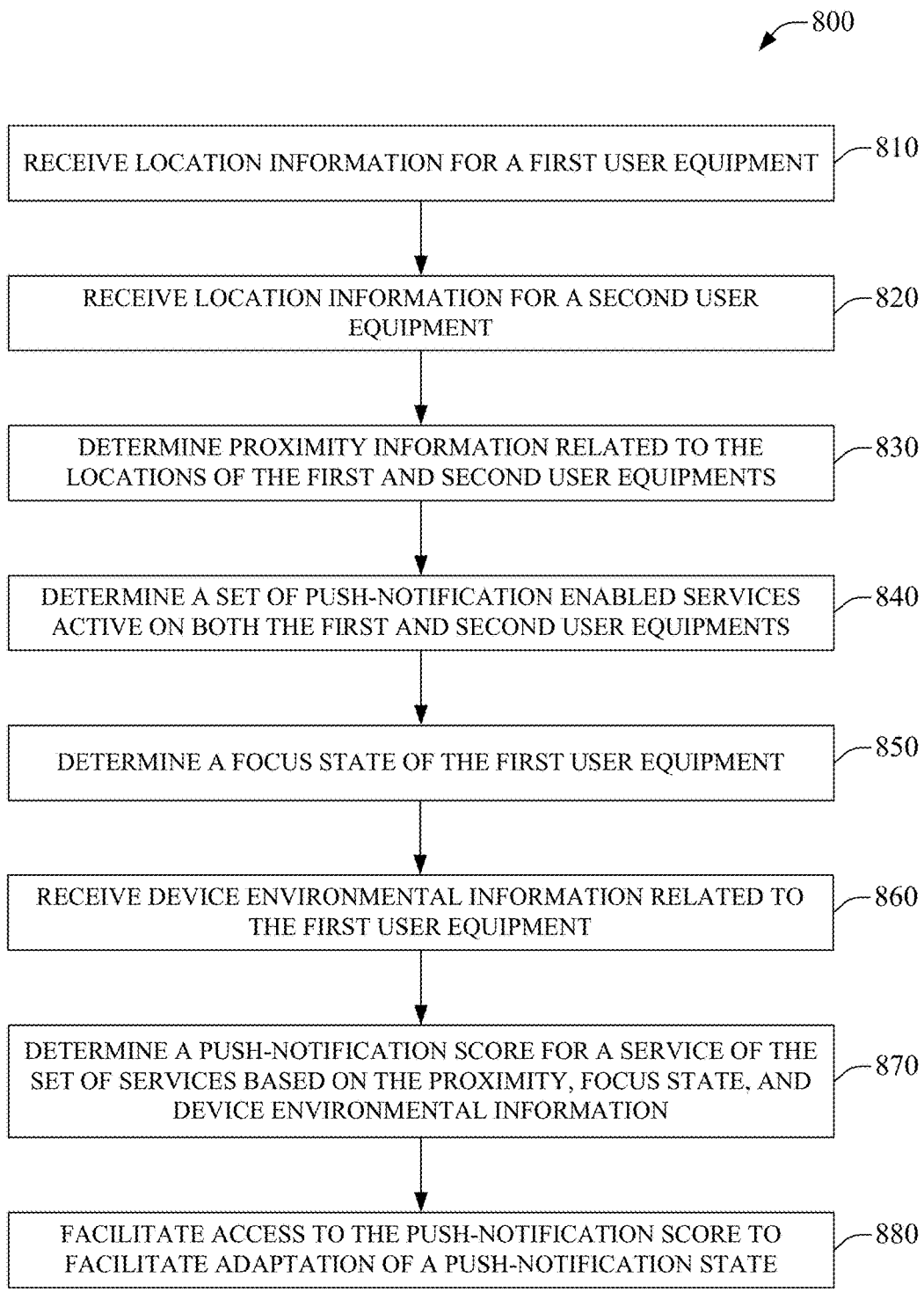
FIG. 8 illustrates a method for facilitating access to score information that can further facilitate the adaptation of a push-notification state in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates aspects of method 600 facilitating adaptation of a push-notification state in accordance with aspects of the subject disclosure. At 610, method 600 can include receiving proximity determination information. Proximity determination information can be received for a second device at a first device. Proximity determination information can be information that can be employing in determining the proximity of a user equipment (UE) in relation to another user equipment. In an aspect, proximity determination information can be location information that can be employed to determine the proximity of two or more devices by comparison of the location information. In another aspect, proximity determination information can be information that infers a level of proximity between two or more devices.

At 650, a push-notification score can be determined. The push-notification score can be for a push-notification enabled service of the first device based on the proximity of the first device and the second device. This push-notification score can reflect a determination related to adapting a push-notification state. The determination can be based on the proximity information. In an aspect, the push-notification score can be based on application of one or more rules or algorithms applied to the information received at 610.

At 680, method 600 can include adapting a push-notification state of the first device based on the push-notification score. At this point, method 600 can end. As an example, where a first and second device are located in close proximity, method 600 can receive proximity determination information from the second device at the first device embodying the close proximity. A determination can then be made of a push-notification score. This score can be for a service running on both the first and second device. The score can indicate that push-notifications can be redundant based on the close proximity of the first and second devices. Based on the push-notification score, a push notification state can be adapted. Where the push-notification score indicates redundancy, a push-notification state of the first device can be adapted to reduce the redundancy or the effects of the redundancy.

FIG. 7 illustrates a method 700 that facilitates adaptation of a push-notification state based on factors in addition to proximity in accordance with aspects of the subject disclosure. At 710, method 700 can include receiving proximity determination information. Proximity determination information can be received for a second device at a first device. Proximity determination information can be information that can be employing in determining the proximity of a user equipment (UE) in relation to another user equipment. In an aspect, proximity determination information can be location information that can be employed to determine the proximity of two or more devices by comparison of the location information. In another aspect, proximity determination information can be information that infers a level of proximity between two or more devices.

At 720, method 700 can include receiving service information for a set of services of the first device. Services can be push-notification enabled services/applications. Push-notification enabled service/application information can include identification of services/applications of first device. As an example, where first device has an installed email service application, this service can be identified. Identification of services/applications can further include determining an account identity of a service/application. Account identity can be used to determine redundancy based on the account associated with the service/application. As an example, where first device has an email service, service identification information can determined for the logged in account of the email service.

At 730, focus state information can be received. This focus state information can be for a service if the set of services of the first device. Focus state information can include a determination of the focus state of the first device. The focus state can be related to a likelihood of a device user observing an indication of a push-notification, e.g., a badge, banner, alert, etc., at the first device. The focus state can be determined from input into the first device. As an example, an input to the first device can be selection of a user interface for an email service, bringing the email service user interface to the foreground of a display of the first device, etc. Additionally, focus state information can include historical focus state information. Historical focus state information can be employed in forming inferences or predicting likely future focus states. Further, historical focus state information can be associated with the history of the first device. Additionally, the historical focus state information can be associated with an identified profile accessed by way of the first device. As an example, where a user logs into a profile on a device, the focus information can comprise the historical focus information for that profile rather than the historical focus information for every user of the device.

At 740, method 700 can include receiving device environment information for the first device. Device environmental information can include connection types/states, charging state, external power state, service usage information, carrier usage information, temperature information, ambient light information, motion information, orientation information, etc. This information can be employed in determining adaption of a push-notification state based on the environment of a device. As an example, where a mobile device is determined to be connected to a highly congested cellular network, push-notification states for services of the mobile device can be demoted or set 'off'.

At 750, a push-notification score can be determine for a push-notification enabled service of the first device based on the service information, the focus state information, and the device environment information of the first device. This push-notification score can reflect a determination related to adapting a push-notification state. The determination can further be based on the proximity information. In an aspect, the push-notification score can be based on application of one or more rules or algorithms applied to the information received at 710, 720, 730, and 740.

At 760, method 700 can include receiving push-notification exception information. In an embodiment, push-notification exception information can be derived from user preferences and be employed in setting adaptable push-notification states. A user preference can be embodied in user preference information, such as in user profile information, settings information, etc. User preference information can be employed to adapt push-notification states, such as where a user preference is to always receive voicemail push-notifications on all devices. This preference can be treated as an exception to other indicated adaptations of push-notification states. As such, where the user preference is for all devices to receive voicemail push-notifications, push-notifications for voicemail can be set 'on', even where there are high levels of redundancy for voicemail push-notification events. At 770, the push-notification score can be updated based on the exception information.

At 780, method 700 can include adapting a push-notification state of the first device based on the updated push-notification score. At this point, method 700 can end. As an example, where a first and second device are located in close proximity, method 700 can receive proximity determination information from the second device at the first device embodying the close proximity. Method 700 can further receive service information for a set of services of the first device, focus state information for the service, device environment information for the first device, and an empty set of exception information. A determination of a push-notification score can then be made for the service. This score can be for a service of the first device, the second device, or both, so long as the service is related to a push-notification redundancy. The score can indicate a level of redundancy for the push-notifications of the service between the first and second device, e.g., a determined level of redundancy, and can be correlated to a determined level of waste of resources, such as redundant wireless signaling and battery usage from redundant push-notification events. Based on the push-notification score, a push notification state can be adapted. Where the push-notification score indicates a level of redundancy, a push-notification state of the first device can be adapted to reduce the level of redundancy or the effects of the redundancy.

FIG. 8 illustrates a method 800 that facilitates access to score information that can further facilitate the adaptation of a push-notification state in accordance with aspects of the subject disclosure. At 810, method 800 can include receiving location information for a first UE. At 820, the method can include receiving location information for a second UE. At 830, proximity information can be determined based on the locations of the first and second UEs.

At 840, method 800 can include determining a set of push-notification enabled services active on both the first and second UEs. Services can be push-notification enabled services/applications. Push-notification enabled service/application information can include identification of services/applications. Identification of services/applications can further include determining an account identity of a service/application. Account identity can be used to determine redundancy based on the account associated with the service/application. In an aspect, the set of push-notification enabled services reflects the union of the set of service on the first UE and the set of services on the second UE. As such, services on both UEs can be anticipated as being redundant push-notifications because the push-notifications would generally be sent to both the first and second UEs in conventional systems.

At 850, a focus state of the first UE can be determined. This focus state information can be for a service if the set of services of the first device. Focus state information can include a determination of the focus state of the first device. The focus state can be determined from input into the first UE. Additionally, focus state information can include historical focus state information. Historical focus state information can be employed in forming inferences or predicting likely future focus states.

At 860, method 800 can include receiving device environmental; information related to the first UE. Device environmental information can include connection types/states, charging state, external power state, service usage information, carrier usage information, temperature information, ambient light information, motion information, orientation information, etc. This information can be employed in determining adaption of a push-notification state based on the environment of a device. As an example, where a mobile device is determined to be connected to a highly congested cellular network, push-notification states for services of the mobile device can be demoted or set 'off'.

At 870, a push-notification score can be determined for a service of the set of services based on the proximity information, the focus state information, and the device environmental information. This push-notification score can reflect a determination related to adapting a push-notification state. The determination can further be based on the proximity information. In an aspect, the push-notification score can be based on application of one or more rules or algorithms applied to the information received at 830, 840, 850, and 860. At 880, method 800 can include facilitating access to the push-notification score. At this point, method 800 can end. The push-notification score can facilitate the adaptation of a push-notification state.

Figure 9:
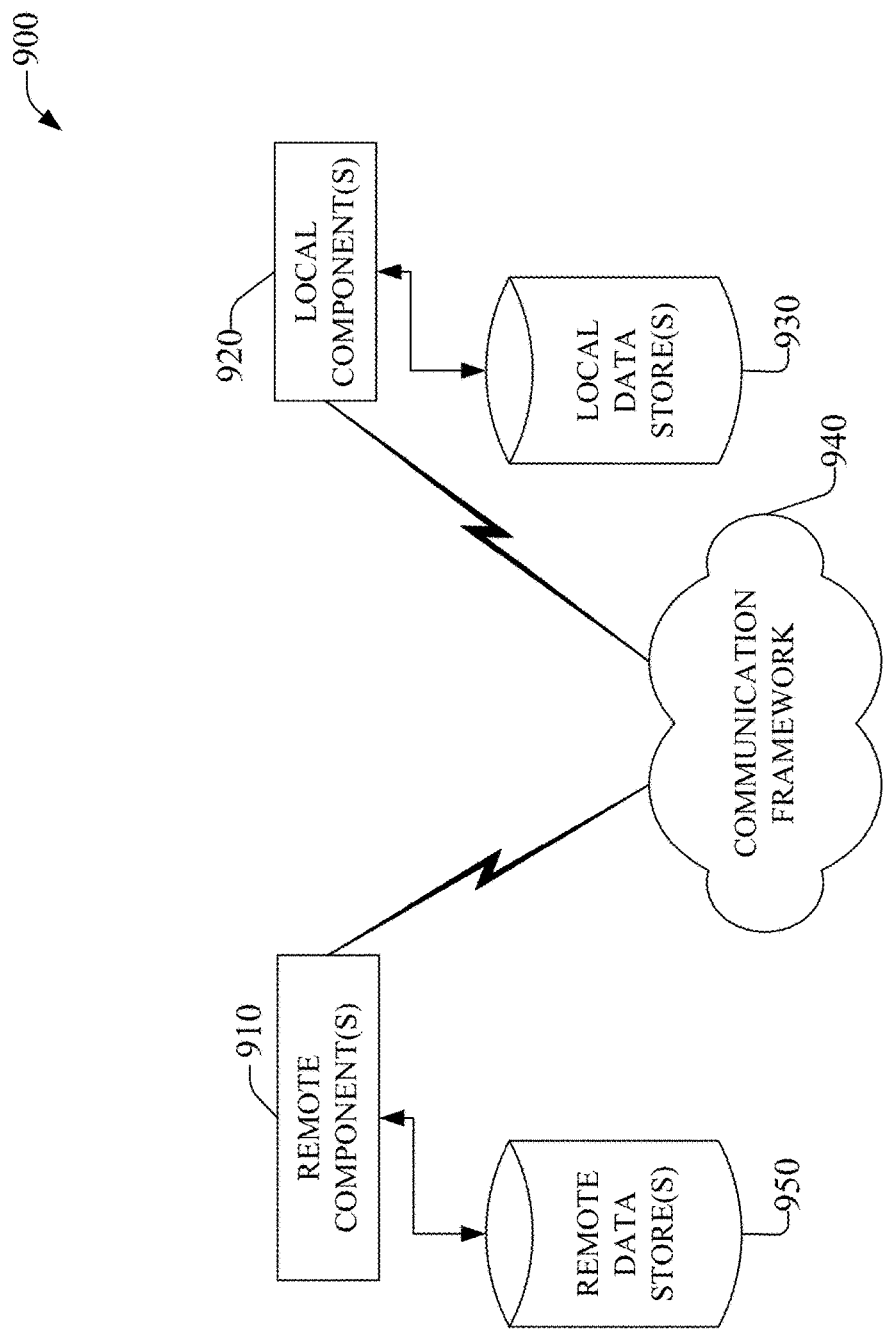
FIG. 9 depicts a schematic block diagram of a computing environment with which the disclosed subject matter can interact.

FIG. 9 is a schematic block diagram of a computing environment 900 with which the disclosed subject matter can interact. The system 900 includes one or more remote component(s) 910, which can include client-side component(s). The remote component(s) 910 can be hardware and/or software (e.g., threads, processes, computing devices). In some embodiments, remote component(s) 910 can include mobile devices, such as smartphones, tablet computers, laptop computers, etc. As an example, remote component(s) 910 can be client devices, such as first device 410, second device 412, N$^{th}$ device 414, device 1 (540), device 2 (542), device 3 (544), device 1 (550), device 2 (552), etc.

The system 900 also includes one or more local component(s) 920, which can include server-side component(s). The local component(s) 920 can be hardware and/or software (e.g., threads, processes, computing devices). In some embodiments, local component(s) 920 can include server devices, base stations such as NodeBs, eNodeBs, etc., access points, etc. As an example, local component(s) 920 can be a network carrier server device, e.g., server device 470, 547, 557, etc., of a wireless telecommunications provider.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. As an example, services information, focus state information, device environment information, proximity determination information, location information, etc., can be communicated over a packet-switched or circuit-switched channels between a mobile device, e.g., remote component 910, and a server device, e.g., a local component 920, over an air interface, such as on a packet-switched or circuit-switched downlink channel. The system 900 includes a communication framework 940 that can be employed to facilitate communications between the remote component(s) 910 and the local component(s) 920, and can include an air interface, e.g., Uu interface of a UMTS network. Remote component(s) 910 can be operably connected to one or more remote data store(s) 950, such as PNS data store 430, 432, 434, etc., that can be employed to store information, such as push-notification state information, on the remote component(s) 910 side of communication framework 940. Similarly, local component(s) 920 can be operably connected to one or more local data store(s) 930, such as PNS data store 437, etc., that can be employed to store information, such as push-notification state information, on the to the local component(s) 920 side of communication framework 940.

Figure 10:
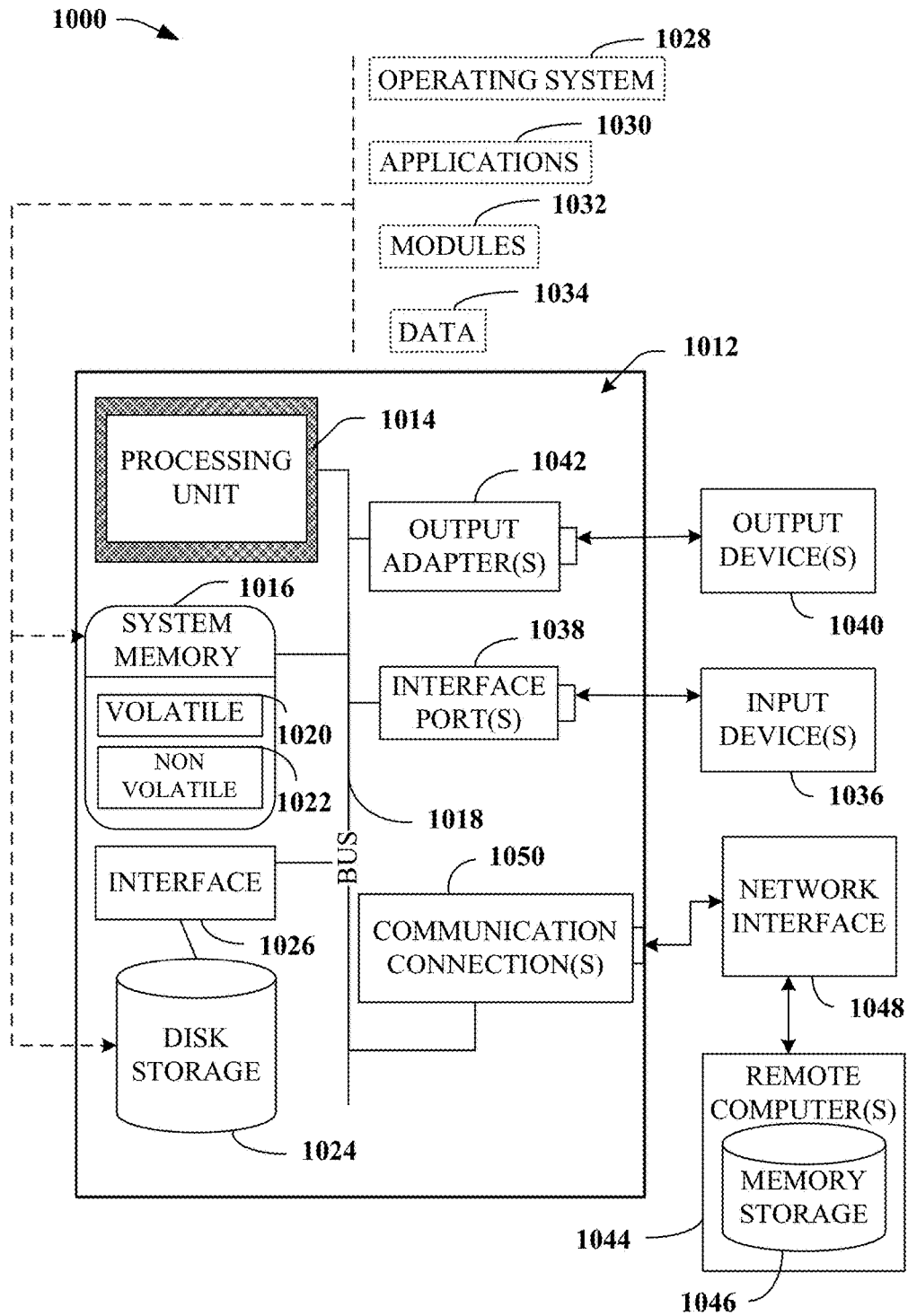
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of push-notification state adaptation component (e.g., 120, 220, 320, 322, 420, etc.), devices 310, 312, 470, 410, 412, 414, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can include volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can include read only memory, programmable read only memory, electrically programmable read only memory, electrically erasable read only memory, or flash memory. Volatile memory 1020 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a user interface can be embodied in a touch sensitive display panel allowing a user to interact with computer 1012, e.g., focus state information is determined from input into a device. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and digital subscriber line modems, integrated services digital network adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; powerline-type networking, e.g., Powerline audio video Ethernet, etc; femto-cell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      receiving first information related to determining a proximity between a first user equipment of user equipments determined to be associated with a user identity and a second user equipment of the user equipments determined to be associated with the user identity;
      determining the proximity between the first user equipment and the second user equipment based on the first information;

determining a proximity score based on the proximity between the first user equipment and the second user equipment, wherein the proximity score is related to a level of redundancy associated with pushing a notification to the first user equipment and the second user equipment;

ranking the user equipments based on the proximity score, wherein the ranking is associated with selecting the first user equipment to receive the notification while the second user equipment does not redundantly receive the notification;

modifying a push-notification state of the notification based on the ranking of the user equipments resulting in selecting the first user equipment to receive the notification and not selecting the second user equipment to redundantly receive the notification; and permitting access, based on the push-notification state, to the notification by the first user equipment.

2. The system of claim 1, wherein the system is part of the first user equipment.

3. The system of claim 2, wherein the system is part of a server device communicatively coupled to the first user equipment.

4. The system of claim 1, wherein the operations further comprise receiving second information related to push-notification enabled services, and wherein the modifying the push-notification state is further based on the second information.

5. The system of claim 4, wherein the receiving the second information comprises receiving account identity information for an account of a service of the push-notification enabled services.

6. The system of claim 1, wherein the operations further comprise receiving second information related to a focus state of the first user equipment based on an input to a user interface of the first user equipment, and wherein the modifying the push-notification state is further based on the second information.

7. The system of claim 6, wherein the receiving the second information comprises receiving information related to a historical focus state of the first user equipment.

8. The system of claim 1, wherein the operations further comprise receiving second information related to an operating environment of the first user equipment, and wherein the modifying the push-notification state is further based on the second information.

9. The system of claim 8, wherein the receiving the second information comprises receiving information related to congestion of a wireless connection with the first user equipment.

10. A method, comprising:
receiving, by a system comprising a processor, first information related to a distance between a first device associated with a user identity and a second device associated with the user identity, wherein a group of devices comprise the first device and the second device;

sorting devices of the group of devices based on a level of redundancy corresponding to distances between the devices, wherein the sorting comprises sorting the first device and the second device by at least the distance between the first device and the second device;

determining, by the system, a push-notification value for a service of the first device based on the sorting of the devices of the group of devices and the distance between the first device and the second device, wherein the push-notification value is related to the level of redundancy associated with pushing a push-notification to a device of the group of devices; and in response to selecting the first device to receive a notification and not selecting the second device to receive the notification based on the push-notification value, permitting, by the system, access to the push-notification value to facilitate adaptation of a push-notification state of the notification to be pushed to the first device based on the level of redundancy indicated by the push-notification value and not to be pushed to the second device based on the level of redundancy indicated by the push-notification value.

11. The method of claim 10, further comprising modifying, by the system, the push-notification state of the first device, and wherein the first device comprises the system.

12. The method of claim 10, further comprising modifying, by the system, the push-notification state of the first device, and wherein a server device comprises the system.

13. The method of claim 10, further comprising receiving, by the system, services information related to push-notification enabled services, and wherein the determining the push-notification value is further based on the services information.

14. The method of claim 13, wherein the receiving the services information comprises receiving account identity information for an account of a push-notification enabled service of the push-notification enabled services comprising the service of the first device.

15. The method of claim 10, further comprising receiving, by the system, focus information related to a focus state of the first device, and wherein the determining the push-notification value is further based on the focus information.

16. The method of claim 10, further comprising receiving, by the system, environment information related to an operating environment of the first device, and wherein the determining the push-notification value is further based on the environment information.

17. A non-transitory machine-readable storage medium, comprising executable instructions that, when executed by a processor, facilitate performance of operations, comprising:
receiving first location information related to a first device determined to be associated with a user identity;
receiving second location information related to a second device determined to be associated with the user identity;
determining a spatial relationship between the first device and the second device based on the first location information and the second location information;
ordering devices of a group of devices comprising the first device and the second device based on a level of redundancy between the devices of the group of devices relative to locations of the devices; and
in response to selecting the first device to receive a push notification and selecting the second device not to receive the push notification based on the ordering of the devices, permitting, by a third device, access to the ranking of the push-notification service to facilitate adaptation of a push-notification state of the push notification to be sent to the first device and not to be sent to the second device.

18. The non-transitory machine-readable storage medium of claim 17, wherein the first device is a user equipment and comprises the third device.

19. The non-transitory machine-readable storage medium of claim 17, wherein the third device is a server located separately from the first device.

20. The non-transitory machine-readable storage medium of claim 17, wherein the operations further comprise receiving exception information related to a received profile associated with a push-notification state preference of a user, and the determining is further based on the exception information.

\* \* \* \* \*